United States Patent [19]
Gaul

[11] Patent Number: 5,767,049
[45] Date of Patent: Jun. 16, 1998

[54] WALLPAPER REMOVER WITH OLEYL SARCOSINE, GLYCERIN, DIBASIC ESTER, AND WATER

[75] Inventor: Kimberley A. Gaul, St. Paul, Mich.

[73] Assignee: Minnesota Mining and Manufacturing Company, St. Paul, Minn.

[21] Appl. No.: 714,832

[22] Filed: Sep. 17, 1996

Related U.S. Application Data

[60] Continuation of Ser. No. 442,467, May 16, 1995, abandoned, which is a division of Ser. No. 314,207, Sep. 28, 1994, abandoned, which is a continuation of Ser. No. 21,125, Feb. 23, 1993, abandoned.

[51] Int. Cl.$^6$ .............................. C11D 7/26; C11D 7/50; C11D 7/60
[52] U.S. Cl. .............................................................. 510/200
[58] Field of Search ..................................................... 510/200

[56] References Cited

U.S. PATENT DOCUMENTS

| | | | |
|---|---|---|---|
| H1513 | 1/1996 | Murch et al. | 252/546 |
| H1514 | 1/1996 | Willman et al. | 252/547 |
| 2,052,884 | 9/1936 | Leatherman | 87/5 |
| 2,317,505 | 4/1943 | Wassell | 252/161 |
| 2,542,385 | 2/1951 | Ayo et al. | 252/137 |
| 3,761,429 | 9/1973 | Yamano et al. | 252/547 |
| 3,950,185 | 4/1976 | Toyama et al. | 134/38 |
| 3,956,162 | 5/1976 | Lautenberger | 252/162 |
| 3,970,584 | 7/1976 | Hart et al. | 252/305 |
| 4,067,773 | 1/1978 | Martin | 195/63 |
| 4,092,175 | 5/1978 | Martin | 134/42 |
| 4,220,549 | 9/1980 | Moore et al. | 252/171 |
| 4,274,884 | 6/1981 | Cartwright | 134/4 |
| 4,338,211 | 7/1982 | Stiros | 252/142 |
| 4,370,174 | 1/1983 | Braithwaite | 134/7 |
| 4,450,090 | 5/1984 | Kinney | 252/106 |
| 4,491,539 | 1/1985 | Hoskins et al. | 252/541 |
| 4,533,545 | 8/1985 | Sebag | 424/70 |
| 4,652,393 | 3/1987 | Ely et al. | 252/158 |
| 4,797,231 | 1/1989 | Schumann et al. | 252/547 |
| 4,863,525 | 9/1989 | Goel et al. | 134/22.19 |
| 4,927,556 | 5/1990 | Pokorny | 252/173 |
| 4,979,526 | 12/1990 | Rudy | 134/4 |
| 4,987,469 | 1/1991 | Seaman, Jr. | 252/170 |
| 4,992,213 | 2/1991 | Mallett et al. | 252/546 |
| 5,051,212 | 9/1991 | Culshaw et al. | 252/546 |
| 5,082,584 | 1/1992 | Loth et al. | 252/122 |
| 5,093,112 | 3/1992 | Birtwistle et al. | 424/70 |
| 5,104,563 | 4/1992 | Anchor et al. | 252/142 |
| 5,203,926 | 4/1993 | Bondurant | 134/42 |
| 5,234,619 | 8/1993 | Greene et al. | 252/108 |
| 5,538,654 | 7/1996 | Lawate et al. | 508/308 |

FOREIGN PATENT DOCUMENTS

| | | |
|---|---|---|
| 612819 | 8/1994 | European Pat. Off. . |
| 1806026 | 5/1970 | Germany . |
| 57-83598 | 5/1982 | Japan . |
| 2058122 | 4/1981 | United Kingdom . |
| 1604391 | 12/1981 | United Kingdom . |

OTHER PUBLICATIONS

McCutchem's *Detergents and Emulsifiers* 1970* Annual Ed. p. 117.

Grant & Hackh's *Chemical Dictionary*, 5th Edition, McGraw–Hill Book Company, 1987, p. 441.

*Cosmetics Science and Technology*, Second Edition, vol. 1, Edited by Balsam et al., Wiley–Interscience, 1972, pp. 179–218.

Primary Examiner—Douglas J. McGinty
Attorney, Agent, or Firm—Doreen S. L. Gwin

[57] ABSTRACT

The present invention comprises a wallpaper remover whose composition includes at least one surfactant, at least one humectant and a major portion water. The composition should be present in an amount sufficient for the composition to be effective in removing wallpaper.

1 Claim, No Drawings

WALLPAPER REMOVER WITH OLEYL SARCOSINE, GLYCERIN, DIBASIC ESTER, AND WATER

This is a continuation of application Ser. No. 08/442,467 accorded a filing, date of May 16, 1995, now abandoned which is a division of application Ser. No. 08/314,207 accorded a filing, date of Sep. 28, 1994, now abandoned, which is a continuation of Application Ser. No. 08/021,125 accorded a filing date of Feb. 23, 1993, now abandoned.

FIELD OF INVENTION

This invention relates to wallpaper remover. In particular, the present invention relates to a wallpaper remover comprising at least one surfactant, at least one humectant and a major portion water.

BACKGROUND OF THE INVENTION

There are generally three different types of wallpaper. The first and simplest type of wallpaper consists solely of a paper backing. The second type of wallpaper comprises a paper backing and a vinylic or acrylic layer coated over the paper backing thereby rendering the paper backing waterproof. A third type of wallpaper is a composite design wherein a vinyl film is laminated onto a paper or fabric backing.

Wallpaper is adhered to a substrate by applying a layer of adhesive and/or paste to either the substrate or the wallpaper and then applying the wallpaper to the substrate. Commonly, pastes such as a mixture of wheat paste and molasses or adhesives based on acrylics, methyl cellulose, carboxymethyl cellulose, starch or mixtures thereof are utilized to secure the wallpaper to the substrate.

Although these adhesives amply secure the wallpaper to the substrate, often it is desirable to remove the wallpaper from the substrate. For example, one may want to repaint the substrate or apply a new wallpaper to the substrate. Because of the wallpaper's tendency to strongly adhere to a substrate, the removal of wallpaper can cause much consternation. The adhesive can transfer to the substrate thus making it necessary to remove the adhesive after the backing has been removed or the adhesion of the adhesive can increase with age thereby increasing the physical labor necessary to remove the wallpaper.

A number of attempts have been made to overcome these problems. One attempt has been to physically remove the wallpaper by applying water or a softening liquid which incorporates water to the wallpaper and then peeling and/or scraping the wallpaper from the substrate. It is theorized that the water acts as an agent to soften the adhesive and/or paste. Once the water or softening liquid has penetrated the wallpaper, the removal of the wallpaper is relatively easy. However, getting the water or softening liquid to the adhesive is not an easy task because the water has a tendency to run off the wallpaper.

In an attempt to maintain better contact of the water and/or the softening liquid with the wallpaper, gels have been utilized to resist displacement of the softening liquid. Although such gels have been used with some success, the removal of the wallpaper, nonetheless, has proven to be tiresome and difficult.

Another attempt to increase the contact of water with the wallpaper is described in U.S. Pat. No. 4,979,526 which describes a method of applying a vapor barrier to the wallpaper to prevent a softening liquid contacting the wallpaper from evaporating thereby maintaining continuous contact between the liquid and the wallpaper until the wallpaper is softened.

Another method of increasing water penetration has been to utilize steamers which direct steam into the wallpaper. However, the steamers are heavy, drip and can cause skin burns.

The problem of increasing water penetration is amplified when the wallpaper has been painted over or when the paper-backing has been rendered waterproof. In essence, the paint layer or the waterproof layer acts a barrier to the wallpaper by hindering penetration of the water thus preventing the softening of the adhesive.

A common method of overcoming this additional problem has been to score and scrub the wallpaper with a wire brush in order to break the surface of the wallpaper thereby allowing penetration of the water into the paper.

Another method of increasing the penetration of water on such surfaces has been to include the use of surfactants in the liquid compositions. The surfactants are mixed with the water and/or softening liquid prior to application to the substrate. In addition, U.S. Pat. No. 4,067,773 and U.S. Pat. No. 4,092,175 disclose wallpaper removers utilizing water, surfactants and enzyme compositions containing carbohydrase or carbohydrase with a protease. Additionally, a liquid containing an activator for the enzyme composition and a solvent for reducing the rate of evaporation are employed. Suitable solvents include glycerine and alcohols such as isopropyl alcohol. However, these methods utilizing surfactants have proven to be less than successful because the surfactant/water mixtures are so thin that they run down the wallpaper surface rather than penetrating into the wallpaper.

To hinder the flow of the softening liquids, thickeners have been employed. U.K. patent application Ser. No. 2,058, 122A utilizes a thickener such as methyl cellulose with an organic solvent such as a glycol ether, water and a wetting agent, i.e., the surfactant. Another example of the use of thickeners is described in U.S. Pat. No. 4,274,884 which utilizes a thickener with an organic compound capable of plasticizing a plastics resin, an emulsifying agent and a minor portion of water, i.e. less than 27.5 weight percent. German Patent No. 1,806,026 describes a mixture containing the following components: (1) water, (2) a water insoluble organic solvent, (3) an emulsifier, (4) a thickening agent and (5) a paraffin.

It has now been found that a wallpaper remover which has an increased propensity to penetrate the wallpaper and ability to soak the underlying adhesive and/or paste can comprise a surfactant(s), a humectant(s) and a major portion water. It has been found that there is no need to utilize an enzyme with wallpaper remover of the present invention.

SUMMARY OF THE INVENTION

The present invention comprises a water-based composition capable of removing wallpaper. The composition comprises a mixture which includes at least one surfactant, at least one humectant and a major portion water present in an amount sufficient for the composition to be effective in removing wallpaper. For the purposes of this application, major portion is understood to be more than half.

In a preferred embodiment of the present invention, the composition can include an organic solvent and/or a thickener.

The present invention also includes a method of use for the composition of the present invention.

DETAILED DESCRIPTION OF THE PRESENT INVENTION

The present invention comprises a sufficient amount of at least one surfactant, at least one humectant and water in a major portion in an amount sufficient to soften wallpaper adhesive so that wallpaper can be removed.

A humectant is added to the composition to ensure that water is absorbed into and through the wallpaper. Humectants are defined as substances that absorb or retain water. Preferred humectants include dihydric and polyhydric alcohols. Examples of suitable polyhydric alcohols include glycerin, propylene glycol and polyglycols such as polyethylene glycol and polypropylene glycol. In addition, modified glycosides such as methyl glucoside commercially available as Glucquat 125 from Amerchol Corporation, Edison, N.J. can be utilized.

A surfactant is added to the composition to stabilize the composition and to act as a wetting agent. Any surfactant which can maintain stability and be used as a wetting agent can be utilized although it is preferred that anionic, nonionic and amphoteric surfactants be utilized. Suitable nonionic surfactants include ethoxylated alcohols, ethoxylated alkyl phenols, fluorinated alkyl esters and sorbitan derivatives such as sorbitan monooleate and polyoxyethylene sorbitan monooleate. Examples of anionic surfactants which can be utilized include sulfates such as ammonium lauryl sulfate, sulfonates such as alkyl aryl sulfonate, sulfosuccinates such as dioctyl ester of sodium sulfosuccininc acid, sarcosine derivatives such as oleoyl sarcosine, fatty acids, fatty acids derivatives and phosphate esters. Suitable amphoteric surfactants include sultaine, betaine and their derivatives such as cocoamidopropyl hydroxysultaine.

It is preferred to add thickeners to the composition of the present invention in order to stabilize the composition and provide good flow control. For example, the presence of a thickening agent allows the composition to be applied easily, level out and have the ability to cling to vertical surfaces.

Suitable thickening agents include gums such as xanthan and guar, locust bean, alginates, polyvinyl alcohol, polyacrylates, starches, clay derivatives, such as amine treated magnesium aluminum silicate, cellulose derivatives such as hydroxypropyl methylcellulose and waxes, e.g., amidized waxes, castor oil derivatives.

If desired, organic solvents can be also added to the composition. Particular classes of organic solvents that can be used include, but are not limited to, aliphatic hydrocarbons such as mineral spirits, monohydric alcohols such as benzyl alcohol and ethanol, esters such as propylene carbonate, ketones and aromatic hydrocarbons. An especially preferred group of esters includes a group of aliphatic acid esters known as dibasic acid esters. Dibasic acid esters can include aliphatic diesters having a molecular weight up to about 200. More than one dibasic ester can be used in the composition of this invention. These diesters are well known in the art and are commercially available as DuPont Dibasic Esters (DBEs), sold by the E.I. du Pont Nemours and Co. Dibasic esters that are preferred for the composition of the present invention are esters from adipic acid ($COOH(CH_2)_4COOH$), glutaric acid ($COOH(CH_2)_3COOH$) and succinic acid ($COOH(CH_2)_2COOH$). Dimethyl esters, diethyl esters, diisopropyl esters and diisobutyl esters of these acids can be used effectively in the composition of this invention.

Other additives can also be added if desired. Examples of the additives which can be added include, but are not limited to, preservatives, fragrances and colorants. If desired, colorants such as pigments, i.e., iron oxide pigments, and dyes, i.e., oil soluble dyes can be added.

The amounts and types of the ingredients in the composition vary according to use. For optimum results, the composition comprises from about 0.1 to about 10 percent by weight of a humectant(s), from about 0.1 to about 10 percent by weight of a surfactant(s), from 0 up to about 10 percent by weight of an organic solvent(s), from 0 up to about 10 percent by weight thickener(s) and the remainder water. More preferably, the composition comprises from about 0.1 to about 5 percent by weight of a humectant(s), from about 0.1 to about 5 percent by weight of a surfactant(s), from 0 up to about 10 percent by weight of an organic solvent(s), from 0 up to about 3.5 percent by weight of thickener(s) and the remainder water. Most preferably, the composition comprises from about 2 to about 4 percent by weight of a humectant(s), from about 2 to about 4 percent by weight of a surfactant(s), from 2 up to about 5 percent by weight of an organic solvent(s), from about 1 to about 3 percent by weight thickener and the remainder water. In addition, it should be understood that the compositions of the present invention are substantially free of enzyme. By substantially free, it is understood that the amount of enzyme is less than 2 percent by weight.

The composition of this invention can be prepared in a number of ways. A preferred method includes first mixing water with humectant and surfactant with a high shear mixer. If desired, a thickener is slowly sifted into the composition. The composition is mixed until it is homogenous.

The composition can be applied to wallpaper in any conventional manner such as by brush, roller, or by spraying the composition onto the wallpaper. However, it should be coated onto the substrate in an amount sufficient to permit adequate soaking and penetration of the wallpaper. The amount of composition applied varies according to use and can be tailored to the user's preference. After application, the composition penetrates into the wallpaper, softening the wallpaper adhesive so that the wallpaper is easily removed by either scraping or peeling.

The following examples are set forth to illustrate this invention and are not intended to limit the scope of this invention thereof.

EXAMPLES

TEST SAMPLES

Wallpaper was applied per package directions onto Spreading Rate Charts (Form 8H-BW, 11 ¼"×17 ¼", The Leneta Company, Ho-Ho-Kus, New Jersey). The samples were dried for 16 hours at ambient conditions, then cured at 160° F. for 72 hours prior to testing.

Painted wallpaper samples were prepared as above, except one coat of Accent Color™ Latex flat paint from General Paint & Chemical Co., Division of Cotter & Company, Gary, Ind., was applied over the ambient dried wallpaper, and dried an additional 24 hours prior to heat curing.

TEST METHODS

WALLPAPER REMOVAL

Wallpaper remover was applied to the surface of the wallpaper samples. Removal was tested by rubbing the wallpaper with a wooden tongue depressor for 15 seconds using firm pressure. Testing was conducted every 5 minutes except for vinyl coated Borden™ Wallpaper which was conducted every 30 seconds. The time was recorded when the wallpaper was fully loosened and removed from the substrate.

EXAMPLE 1

The test sample of Example 1 was prepared in the following manner:

1.62 grams of Hectabrite™ DP, bentonite, commercially available from American Colloid Company, Arlington Heights, Ill. was mixed with 30.0 grams of deionized water using a high shear mixer. Added, in order, were 63.38 grams of deionized water, 1.0 gram glycerin, 99.7% commercially available from Witco, 0.28 grams Tween 80, polysorbate 80 commercially available from ICI Specialty Chemicals, Wilmington, Del., 0.22 grams Span™ 80, sorbitan monooleate from ICI Specialty Chemicals, Wilmington, Del., 2.0 grams DBE3, dimethyl adipate commercially available from DuPont, Wilmington, Del., 1.0 grams Methocel™ J12MS, hydroxypropyl cellulose, commercially available from the Dow Chemical Company, Midland, Mich., and 0.5 grams Rhodopol™ 23, xanthan gum, commercially available from RT Vanderbilt Company, Norwalk, Conn. The composition was mixed until homogeneous. The ingredients used, the weight percentage of the ingredients and test results (reported as the time for wallpaper removal in minutes) are reported in Table 1.

EXAMPLES 2–8

These examples, all of which were prepared in accordance with the methods described in Example 1, illustrate various compositions found within the scope of the present invention. Examples 2–10 varied in that different ingredients and different weight percentages of the ingredients were used. The ingredients used, the weight percentage of the ingredients and test results (reported as the time for wallpaper removal in minutes) are reported Table 1.

different weight percentages of the ingredients were used. The ingredients used, the weight percentage of the ingredients and test results (reported as the time for wallpaper removal in minutes) are reported in Table 2.

TABLE 2

|  | Example 9 | Example 10 |
| --- | --- | --- |
| Hectabrite ™ DP | 1.62 | 2.00 |
| Methocel ™ J12MS | 0.30 | 0.50 |
| Rhodopol ™ 23 | 0.15 | 0.25 |
| polyethylene glycol 200[1] | 1.00 | — |
| propylene glycol[2] | — | 2.50 |
| Hamposyl ™ O | 1.00 | 2.50 |
| Tween ™ 80 | 0.08 | — |
| Span ™ 80 | 0.07 | — |
| DBE3 | 2.00 | 2.00 |
| water | 93.78 | 90.25 |
| Removal time (min) of vinyl coated Eisenhart wallpaper | 30 | 5 |
| Removal time (min) of vinyl coated Borden ™ Wallpaper | 1 | 1 |

[1]Polyethylene glycol 200, commercially available as Polyglycol E200 ™ from the Dow Chemical Company, Midland, MI.
[2]commercially available from the Dow Chemical Company, Midland, MI.

TABLE 1

|  | Example 1 | Example 2 | Example 3 | Example 4 | Example 5 | Example 6 | Example 7 | Example 8 |
| --- | --- | --- | --- | --- | --- | --- | --- | --- |
| Hectabrite ™ DP | 1.62 | 1.62 | 1.62 | 1.62 | 1.62 | 1.62 | 1.62 | 1.62 |
| Methocel ™ J12MS | 1.00 | 0.50 | 0.60 | 0.20 | 0.30 | 0.40 | 0.40 | 0.40 |
| Rhodopol ™ 23 | 0.50 | 0.30 | 0.30 | 0.10 | 0.15 | 0.20 | 0.20 | 0.20 |
| glycerin | 1.00 | 0.50 | 0.25 | 4.00 | 2.25 | 2.50 | 2.50 | 2.50 |
| Hamposyl ™ O[1] | — | 1.00 | 0.25 | 4.00 | 2.25 | — | — | — |
| Stepanol ™ AMV[2] | — | — | — | — | 2.50 | — | — | — |
| Mirataine ™ CBS[3] | — | — | — | — | — | — | 8.30 | — |
| Ninate ™ 411[4] | — | — | — | — | — | — | — | 2.70 |
| Tween ™ 80 | 0.28 | 0.06 | 0.06 | 0.06 | 0.06 | — | — | — |
| Span ™ 80 | 0.22 | 0.04 | 0.04 | 0.04 | 0.04 | — | — | — |
| DBE3 | 2.00 | 2.00 | 2.00 | 2.00 | 2.00 | 2.00 | 2.00 | 2.00 |
| water | 93.38 | 93.98 | 94.88 | 87.98 | 91.33 | 90.78 | 84.98 | 90.58 |
| Removal time (min) of vinyl-coated Eisenhart wallpaper[5] | 25 | 30 | 30 | 15 | 10 | 10 | 10 | 10 |
| Removal time (min) of vinyl-coated Borden Wallpaper[6] | 5 | 5 | 7 | 2 | 0.5 | 1 | 2 | 1 |

[1]oleoyl sarcosine, commercially available from WR Grace & Co., Nashau, NH.
[2]ammonium lauryl sulfate, commercially available from Stepan Company, Northfield, IL.
[3]sultaine, commercially available from Rhone-Poulenc Surfactants & Specialties, Cranbury, NJ.
[4]amine alkyl aryl sulfonate, commercially available from Stephan Company, Northfield, IL.
[5]vinyl-coated paper, prepasted, style #555, run number K5268 3, Eisenhart Wallcoverings Co., Hanover PA.
[6]vinyl-coated paper, pattern WC 554, lot number 42H, Borden Home Wallcoverings ™, Borden, Inc., Chemical Division, Columbus, OH.

The test results in Table 1 indicate that the compositions of the present invention do provide good removal times for wallpaper.

EXAMPLES 9–10

Examples 9 and 10 were prepared in accordance with the methods described in Example 1 and illustrate various compositions found within the scope of the present invention. Examples 9–10 varied in that different ingredients and The test results indicate that the compositions of the present invention do provide good wallpaper removal times.

EXAMPLES 11–15

Examples 11–15 were prepared in accordance with the methods described in Example 1 and illustrate the use of different weight ratios of solvents. The ingredients used, the weight percentage of the ingredients and test results (reported as the time for wallpaper removal in minutes) are reported in Table 3.

TABLE 3

|  | Example 11 | Example 12 | Example 13 | Example 14 | Example 15 |
|---|---|---|---|---|---|
| Hectabrite ™ DP | 1.62 | 1.62 | 1.62 | 1.62 | 1.62 |
| Methocel ™ J12MS | 0.40 | 0.40 | 0.40 | 0.40 | 0.30 |
| Rhodopol ™ 23 | 0.20 | 0.20 | 0.20 | 0.15 | 0.15 |
| glycerin | 2.50 | 2.50 | 2.50 | 1.00 | 2.00 |
| Hamposyl ™ O | 2.50 | 2.50 | 2.50 | 1.00 | 2.00 |
| Tween ™ 80 | — | — | — | 0.06 | 0.08 |
| Span ™ 80 | — | — | — | 0.04 | 0.07 |
| DBE3 | 0.10 | 5.00 | 10.00 | — | — |
| water | 92.68 | 87.78 | 82.78 | 95.73 | 93.78 |
| Removal time (min) of vinyl-coated Eisenhart wallpaper | 10 | 5 | 5 | 25 | 20 |
| Removal time (min) of vinyl-coated Borden ™ Wallpaper | 2 | 0.5 | 0.5 | 6 | 3 |

The test results indicated in Table 3 indicate that compositions of the present invention do provide good removal times for wallpaper.

EXAMPLES 16–22

Examples 16–22 were prepared in accordance with the methods described in Example 1 and illustrate the use of different solvents and their weight ratios. The ingredients used, the weight percentage of the ingredients and test results (reported as the time for wallpaper removal in minutes) are reported in Table 4.

The test results indicate that compositions of the present invention do provide good wallpaper removal times when different organic solvents are used.

Comparative Example 1

The test sample of Comparative Example 1 was prepared according to the directions outlined in Example B in U.K. Patent Application No. 2,058,122A. The test sample was prepared by mixing 39 grams of Hi Sol 10, an aromatic blend commercially available from the Ashland Chemical Company, Columbus, Ohio, 155.5 grams deionized water, 1.6 grams Neodol 25-7, a $C_{12}$–$Cl_{15}$ linear alcohol ethoxylate, commercially available from the Shell Chemical Company, and 3.9 grams of Methocel™ A4M, methyl cellulose, commercially available from Dow Chemical Company, Midland, Mich. The composition was mixed until homogeneous. The test results (reported as the time for wallpaper removal in minutes) are reported in Table 5.

Comparative Example 2

Comparative Example 2 examined the ability of DIF Wallpaper Stripper™, commercially available prepared from William Zinsser & Company, Inc., Somerset, N.J. The composition of the concentrate is the subject of U.S. Pat. Nos. 4,067,773 and 4,092,175 and contains enzyme, dipropylene glycol methyl ether, water, surfactant and propylene glycol. The test sample was prepared in accordance with package directions by mixing 10.15 grams of concentrate in 4 ounces (118 ml.) of hot tap water. The test results (reported as the time for wallpaper removal in minutes) are reported in Table 5.

Comparative Example 3

Comparative Example 3 examined the ability of Dissolve™ Wallpaper Remover, commercially available from Decorator Products, Inc., Shawnee Mission, Kans., to remove wallpaper. The test sample was prepared in accordance with package directions by mixing 1.87 grams of

TABLE 4

|  | Example 16 | Example 17 | Example 18 | Example 19 | Example 20 | Example 21 | Example 22 |
|---|---|---|---|---|---|---|---|
| Hectabrite ™ DP | 2.00 | 2.00 | 2.00 | 2.00 | 2.00 | 2.00 | 2.00 |
| Methocel ™ J12MS | 0.40 | 0.40 | 0.40 | 0.40 | 0.40 | 0.40 | 0.40 |
| glycerin | 2.50 | 2.50 | 2.50 | 2.50 | 2.50 | 2.50 | 2.50 |
| Hamposyl ™ O | 2.50 | 2.50 | 2.50 | 2.50 | 2.50 | 2.50 | 2.50 |
| Mineral Spirits[1] | 2.00 | — | — | — | — | — | — |
| Benzyl alcohol[2] | — | 2.00 | — | — | — | — | — |
| dimethyl succinate[3] | — | — | 2.00 | — | — | — | — |
| DBE-IB[4] | — | — | — | 2.00 | — | — | — |
| Aromatic 150[5] | — | — | — | — | 2.00 | — | — |
| propylene carbonate[6] | — | — | — | — | — | 2.00 | — |
| methyl ethyl ketone[7] | — | — | — | — | — | — | 2.00 |
| water | 90.60 | 90.60 | 90.60 | 90.60 | 90.60 | 90.60 | 90.60 |
| Removal time (min) of vinyl-coated Eisenhart wallpaper | 10 | 5 | 5 | 5 | 5 | 10 | 5.00 |
| Removal time (min) of vinyl-coated Borden ™ Wallpaper | 1.0 | 0.5 | 0.5 | 0.5 | 0.5 | 1.0 | 0.5 |

[1] commercially available from Exxon Chemical Company, Houston, TX.
[2] commercially available from Aldrich Chemical Company, Milwaukee, WI.
[3] commercially available as DBE4 from Dupont, Wilmington, Delaware
[4] a blend of diisobutyl esters of adipic, glutaric & succinic acids, available from DuPont.
[5] an aromatic hydrocarbon blend commercially available from Exxon Chemical Company, Houston, TX.
[6] commercially available as Arconate HP, Arco Chemical Company, Newtown Square, PA.
[7] commercially available from the Union Carbide Corporation, Danbury, Conn.

concentrate in 4 ounces (118 ml.) of hot tap water. The test results (reported as the time for wallpaper removal in minutes) are reported in Table 5.

Comparative Example 4

Comparative Example 4 examined the ability of Sherwin-Williams™ Wallpaper Remover, distributed by the Sherwin-Williams Company, Cleveland, Ohio, to remove wallpaper. The test sample was prepared in accordance with package directions by mixing 1.4 grams of concentrate in 4 ounces (118 ml.) of hot tap water. The test results (reported as the time for wallpaper removal in minutes) are reported in Table 5.

Comparative Example 5

Comparative Example 5 examined the ability of Wallcovering Remover™, commercially available from Sears, Roebuck and Co., Chicago, Ill. to remove wallpaper. The composition of the concentrate comprises octylphenoxy polyethoxy ethanol, alkylarylpolyether alcohol, defoamer and water. The test sample was prepared in accordance with package directions by mixing 1.87 grams of concentrate in 4 ounces (118 ml.) of hot tap water. The test results (reported as the time for wallpaper removal in minutes) are reported in Table 5.

Comparative Example 6

Comparative Example 6 examined the ability of Easyoff Wallpaper Remover™, commercially available from KleanStrip, a division of W.M. Barr Inc., Memphis, Tenn. to remove wallpaper. The composition of the concentrate comprised nonylphenoxypolyethoxy ethanol, isopropyl alcohol and ethanol. The test sample was prepared in accordance with package directions by mixing 2.5 grams of concentrate in 4 ounces (118 ml.) of hot tap water. The test results (reported as the time for wallpaper removal in minutes) are reported in Table 5.

TABLE 5

| | C1 | C2 | C3 | C4 | C5 | C6 |
|---|---|---|---|---|---|---|
| Removal time (min) vinyl-coated paper[1] | 5 | 3 | 2 | 1 | 2 | 3 |
| Removal time (min) vinyl-coated paper[2] | 30 | 15 | 10 | 5 | 10 | 15 |
| Removal time (min) vinyl paper[3] | 10 | 5 | 15 | 15 | 5 | 5 |
| Removal time (min) painted vinyl-coated paper[1] | 35 | 20 | 20 | 15 | 15 | 25 |
| Removal time (min) plastic paper[4] | 55 | >80 | >80 | >80 | >80 | >80 |
| Removal Time (min) fabric-backed-vinyl[5] | 40 | >60 | >60 | >60 | >60 | >60 |

[1] Vinyl-coated paper, prepasted, pattern WC 554, lot number 42H, Borden Home Wallcoverings ™ Borden, Inc., Chemical Division, Columbus, OH.
[2] Vinyl-coated paper, prepasted, style #555, run number K5268 3, Eisenhart Wallcoverings Co., Hanover, PA.

TABLE 5-continued

| | C1 | C2 | C3 | C4 | C5 | C6 |
|---|---|---|---|---|---|---|

[3] Paper-backed vinyl, prepasted, pattern RS 8334 03142110, lot number 45, International Wallcoverings, Brampton, Ontario
[4] Contact® Self-Adhesive Plastic Decorative Covering, pattern 9143 Hart N FLWR, Rubbermaid Incorporated, Wooster, OH.
[5] Fabric-backed vinyl, Essex Wallcoverings, pattern number 362-2672, run number 4668, GenCorp Polymer Products, Hackensack, NJ. Applied with ALLPRO® professional EXTRA STRENGTH VINYL wallcovering Adhesive 600, ALLPRO® Corporation, Tampa, FL.

The test results in Table 5 indicate that the test samples of the comparative examples were not as effective in removing wallpaper sample as are the compositions of the present invention. Comparative Examples C1 to C6 were unable to remove some types of wallpaper. Example C1 did remove the samples, but times were noticeably slower than the examples of the present invention.

Examples 23-25

Examples 23-25 were prepared in accordance with the methods described in Example 1 and illustrate various compositions found within the scope of the present invention. The ingredients used, the weight percentage of the ingredients and test results (reported as the time for wallpaper removal in minutes) are reported in Table 6.

TABLE 6

| | Example 23 | Example 24 | Example 25 |
|---|---|---|---|
| Hectabrite ™ DP | 1.62 | 1.62 | 1.62 |
| Methocel ™ J12MS | 0.40 | 0.40 | 0.40 |
| Rhodopel ™ 23 | 0.20 | 0.20 | 0.20 |
| glycerin | 2.50 | 2.50 | 2.50 |
| Hamposyl ™ O | 2.50 | 2.50 | 2.50 |
| DBE3 | 0.10 | 2.00 | 5.0 |
| water | 92.68 | 90.78 | 87.78 |
| Removal time (min) of vinyl-coated wallpaper[1] | 2 | 0.5 | 0.5 |
| Removal time (min) of vinyl-coated wallpaper[2] | 10 | 5 | 5 |
| Removal time (min) of vinyl-coated wallpaper[3] | 5 | 5 | 5 |
| Removal time (min) of painted vinyl wallpaper[1] | 15 | 10 | 15 |
| Removal time (min) of plastic wallpaper[4] | 60 | 50 | 45 |
| Removal time (min) of fabric backed-vinyl wallpaper[5] | >70 | 20 | 15 |

[1] Vinyl-coated paper, prepasted, style #555, run number K5268 3, Eisenhart Wallcoverings Co., Hanover, PA.
[2] Vinyl-coated paper, prepasted, pattern WC 554, lot number 42H, Borden Home Wallcoverings Borden, Inc., Chemical Division, Columbus, OH.
[3] Paper-backed vinyl, prepasted, pattern RS 8334 03142110, lot number 45, International Wallcoverings, Brampton, Ontario.
[4] Con-tact® Self-Adhesive Plastic Decorative Covering, pattern 9143 Hart N FLWR, Rubbermaid Incorporated, Wooster, OH.
[5] Fabric-backed vinyl, Essex Wallcoverings, pattern number 362-2672, run number 4668, GenCorp Polymer Products, Hackensack, NJ. Applied with ALLPRO® professional EXTRA STRENGTH VINYL wallcovering Adhesive 600, ALLPRO® Corporation, Tampa, FL.

The test results in Table 6 indicate that the compositions of the present invention have good wallpaper removal times.

In summary, novel compositions utilized to remove wallpaper has been described. Although specific embodiments and examples have been disclosed herein, it should be borne in mind that these have been provided by way of explanation and illustration and the present invention is not limited thereby. Certainly, modifications which are within the ordinary skill in the art are considered to lie within the scope of this invention as defined by the following claims including all equivalents.

I claim:
1. A wallpaper removing composition comprising:
about 2 to about 4 wt-% of oleyl sarcosine;
about 2 to about 4 wt-% of glycerin;
about 2 to about 5 wt-% of an aliphatic dibasic acid ester;
up to 3 wt-% thickener; and
at least 84 wt-% water, said composition being efficient in removing wallpaper and wherein said composition is substantially free of enzyme.

* * * * *